(12) United States Patent
Bhide et al.

(10) Patent No.: US 11,715,037 B2
(45) Date of Patent: Aug. 1, 2023

(54) VALIDATION OF AI MODELS USING HOLDOUT SETS

(71) Applicant: International Business Machines Corporation, Armonk, NY (US)

(72) Inventors: Manish Anand Bhide, Hyderabad (IN); Ravi Chandra Chamarthy, Hyderabad (IN); Madhavi Katari, Kondapur (IN)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 17/018,477

(22) Filed: Sep. 11, 2020

(65) Prior Publication Data

US 2022/0083899 A1 Mar. 17, 2022

(51) Int. Cl.
G06N 20/00 (2019.01)
G06F 16/20 (2019.01)
G06F 16/28 (2019.01)

(52) U.S. Cl.
CPC ............ *G06N 20/00* (2019.01); *G06F 16/20* (2019.01); *G06F 16/28* (2019.01)

(58) Field of Classification Search
None
See application file for complete search history.

(56) References Cited

U.S. PATENT DOCUMENTS

| | | | | |
|---|---|---|---|---|
| 5,553,218 A * | 9/1996 | Li | ............ | G06F 16/284 |
| | | | | 707/999.102 |
| 6,282,529 B1 * | 8/2001 | Neuneier | ............ | G06F 18/2413 |
| | | | | 706/15 |
| 2003/0171943 A1 * | 9/2003 | Stockard | ............ | A61L 2/28 |
| | | | | 422/3 |
| 2004/0199334 A1 * | 10/2004 | Kovesdi | ............ | G16C 20/30 |
| | | | | 703/11 |
| 2005/0114377 A1 * | 5/2005 | Russell | ............ | G06F 16/285 |
| | | | | 707/999.102 |
| 2007/0214135 A1 * | 9/2007 | Crivat | ............ | G06F 16/2465 |
| 2012/0239613 A1 * | 9/2012 | Danciu | ............ | G06Q 10/06 |
| | | | | 707/603 |
| 2012/0278275 A1 * | 11/2012 | Danciu | ............ | G06Q 10/06 |
| | | | | 706/59 |
| 2016/0055589 A1 * | 2/2016 | Billings | ............ | G06Q 40/08 |
| | | | | 705/4 |

(Continued)

FOREIGN PATENT DOCUMENTS

EP 3483797 A1 5/2019

OTHER PUBLICATIONS

Mell, et al., "The NIST Definition of Cloud Computing," Recommendations of the National Institute of Standards and Technology, U.S. Department of Commerce, Special Publication 800-145, Sep. 2011, 7 pgs.

(Continued)

*Primary Examiner* — Ryan Barrett
(74) *Attorney, Agent, or Firm* — Jared L. Montanaro; Heather Johnston

(57) ABSTRACT

A processor may receive an original dataset. The processor may segment, automatically, the original dataset into a plurality of data groups. The plurality of data groups may include a model training dataset and a holdout dataset. The processor may generate a model with the model training dataset. The processor may validate the model with the holdout dataset.

17 Claims, 9 Drawing Sheets

(56) References Cited

U.S. PATENT DOCUMENTS

| | | |
|---|---|---|
| 2017/0243140 A1 | 8/2017 | Achin |
| 2020/0143243 A1 | 5/2020 | Liang |
| 2021/0042656 A1* | 2/2021 | Watson .................. G06N 3/084 |
| 2021/0326782 A1* | 10/2021 | Achin .................. G06F 9/5011 |
| 2021/0390455 A1* | 12/2021 | Schierz .................... G06N 5/04 |
| 2022/0058500 A1* | 2/2022 | Reznic .................. G06N 5/043 |
| 2022/0067577 A1* | 3/2022 | Serebryakov ......... G06F 18/241 |

OTHER PUBLICATIONS

Nagarajah, et al., "An Extensive Checklist for Building AutoML Systems." Published Apr. 14, 2019. 15 pages. Published by AMIR. http://ceur-ws.org/Vol-2360/paper7AutoMLChecklist.pdf.
Schelter, et al., "Automating Large-Scale Data Quality Verification." Published Aug. 2018. 14 pages. Published by VLDB Endowment. https://dl.acm.org/doi/10.14778/3229863.3229867.

* cited by examiner

500

Project 530

Segmented Dataset 504

Training Dataset 540

Linked Datasets 510M

Dataset 512M

Dataset 514M

Dataset 518M

Holdout Dataset 550

Linked Datasets 510H

Dataset 512H

Dataset 514H

Dataset 518H

Transformation 506

Transformed Segmented Dataset 504-T

Training Dataset 540-T

Linked Datasets 510M-T

Dataset 512M-T

Dataset 514M-T

Dataset 518M-T

Holdout Dataset 550-T

Linked Datasets 510H-T

Dataset 512H-T

Dataset 514H-T

Dataset 518H-T

FIG. 5

VALIDATION OF AI MODELS USING HOLDOUT SETS

BACKGROUND

The present disclosure relates generally to the field of artificial intelligence modeling, and more specifically to validation of artificial intelligence models.

Artificial intelligence models need to undergo proper validation before deployment for production. Model validators perform the validation of the models and approve or reject them. In most enterprises, the quantity of data scientists far outnumber the quantity of model validators, and model validation requires a significant amount of time; as a result, deployment of models is often delayed because of resource constraints on model validators.

SUMMARY

Embodiments of the present disclosure include a system, method, and computer program product for automating model validation.

In some embodiments, a processor may receive an original dataset. The processor may segment, automatically, the original dataset into a plurality of data groups. The plurality of data groups may include a model training dataset and a holdout dataset. The processor may generate a model with the model training dataset. The processor may validate the model with the holdout dataset.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

FIG. 5 illustrates a block diagram of transformation of a training dataset and a holdout dataset according to an embodiment of the disclosure.

Figure 1:
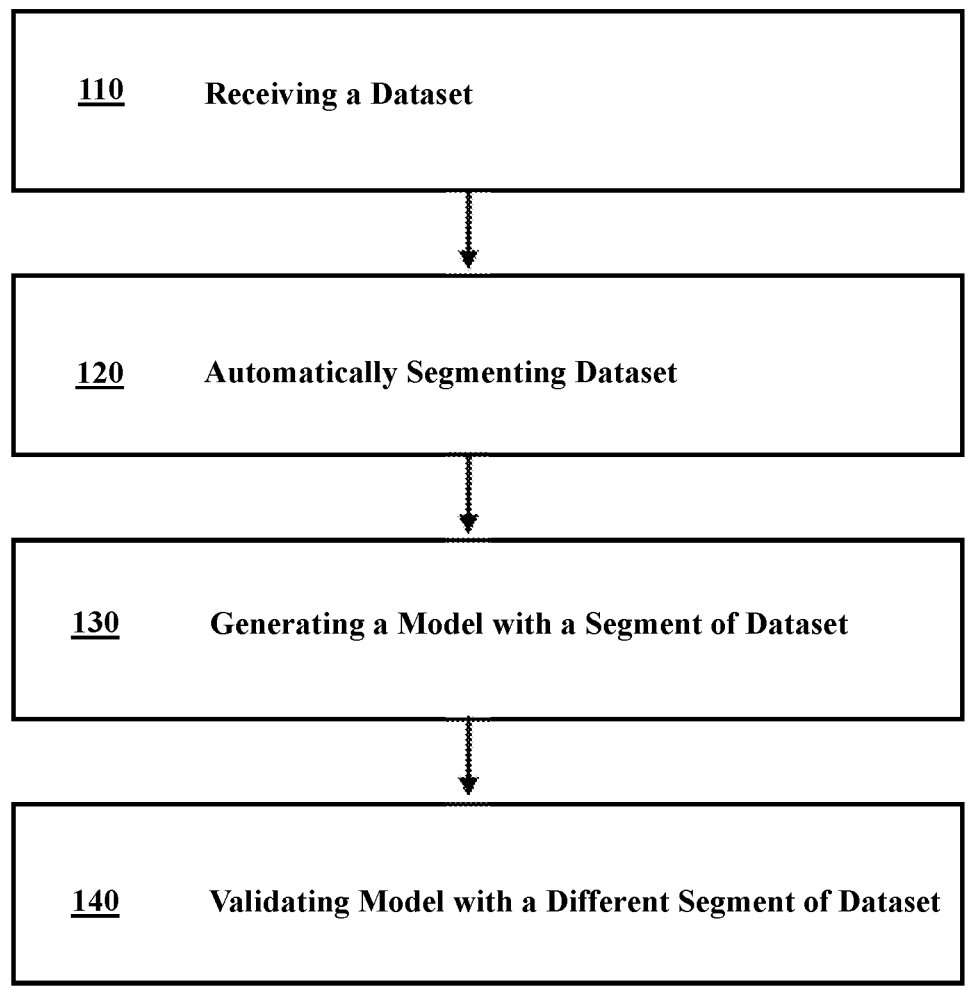
FIG. 1 illustrates a flowchart of a method/process for validating AI models according to an embodiment of the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of artificial intelligence modeling, and more specifically to validation of artificial intelligence models. It will be readily understood that the instant components, as generally described and illustrated in the figures herein, may be arranged and designed in a wide variety of different configurations. Thus, the following detailed description of the embodiments of at least one of a method, apparatus, non-transitory computer readable medium, and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language throughout this specification refers to the fact that a particular feature, structure, or characteristic described in connection with the embodiment may be included in at least one embodiment. Thus, appearances of the phrases "example embodiments," "in some embodiments," "in other embodiments," or other similar language throughout this specification do not necessarily all refer to the same group of embodiments, and the described features, structures, or characteristics may be combined or removed in any suitable manner in one or more embodiments. Further, in the diagrams, any connection between elements can permit one-way and/or two-way communication even if the depicted connection is a one-way or a two-way arrow. Also, any device depicted in the drawings can be a different device. For example, if a mobile device is shown sending information, a wired device can also be used to send the information.

Artificial intelligence (AI) models are trained and validated before deployment for production and use. Generally, data scientists or AI model engineers build and train models and model validators perform the validation of the models and approve or reject them based on the validation test results. In many cases, the AI model builders and trainers outnumber the model testers and validation data is not readily available; this often results in a bottleneck at the validation stage of model development.

Some of the advantages disclosed herein provide for the automating of some or all of the validation of AI models, thereby reducing the time delay models face in the validation stage. Model validators typically spend significant time searching for the right data for validation. Validation data should be unavailable to any data scientist who trained the model to ensure it is different from the data the model was trained on. Finding and making use of the right data takes a substantial amount of time.

Further, the present disclosure offers a system, method, and computer program product to automatically validate an artificial intelligence model and thereby reduce or remove dependency on artificial intelligence model validators. Typically, model validators spend a lot of time trying to find proper data for model validation. This data needs to be unavailable to the data scientist because it must be different from the data on which the model was trained to properly validate the model. Finding and making use of such data takes a lot of time. This is particularly true because many model validators are not skilled at data engineering or data science.

It may be beneficial to describe certain terms relevant to the disclosure.

In AI modeling, bias is the tendency of a model to consistently make unsupported predictions as a result of failure to take into account all relevant information. Bias may result from a model's inability to learn a true signal from a dataset or it may result from erroneous assumptions which lead to missed relevant correlations. Bias may come in many forms: sample bias, selection bias, reporting bias, exclusion bias, measurement bias, recall bias, and observer bias, among others. Sample bias may be the result of training and validation datasets failures to reflect realities of the environment of use of the model. Selection bias may be the result of training and validation data not reflecting a random sample. Reporting bias may be the result of collected data not being a true representation of the real world. Exclusion bias may be the result of disposing of relevant data because it is erroneously tagged as irrelevant or unimportant, or it may be the result of excluding information which is relevant. Measurement bias may be the result of data distortion flowing from data collection for training and validation differing from data collected during use in the real world. Recall bias may be the result of inconsistent data labeling. Observer bias is also known as confirmation bias; it may be the result of expecting, consciously or subconsciously, certain data to tend toward certain determinations and as a result that data actually does tend toward those determinations.

Bias may be mitigated to obtain de-biased models. To mitigate bias, bias may be measured and compared to a control group. A shadow model may be developed to predict the biased output of a model and therefore enable compensating the bias of the model.

Fairness may be used as a measure of potential bias a model exhibits. Fairness is measured for various monitored groups configured within a program running a model. A model is considered to be fair when results are independent of inconsequential variables. For example, if a bank were considering approving a loan to a person, a model may be more objectively fair if the decision is not influenced by the name of the person because the name of a person does not impact the ability of that person to repay the loan.

Drift may result from changes to the input data. Drift may occur with changes in the environment, feature data, or target dependencies. A model with degrading performance over time may be influenced by drift. Drift may be described in three categories: concept drift, data drift, and changes in upstream data. Concept drift may mean the change in the relationship between input data and properly predicted results. Data drift may mean training data fails to reflect real time changes in data; an example of this in a geographic region with distinct seasons is training data used for predicting summer apparel purchases likely will poorly predict apparel purchases during winter months. Changes in upstream data may refer to operational alterations to information used in the model, such as selecting a different unit of measurement or no longer using certain variables.

Quality may refer to the ability of a model to fulfill its purpose. Quality may be greatly influenced by training data. Quality may be described in six categories: completeness, consistency, timelessness, validity, uniqueness, and accuracy. Completeness may refer to the anticipated comprehensiveness of a training dataset. Consistency may refer to the training data for a model reflecting the same information used in similar applications. Timelessness may refer to whether necessary data is available at the time it is required. Validity may refer to a dataset conforming to a defined format, range, and type. Uniqueness may refer to the non-duplicative nature of data entries within a dataset. Accuracy may refer to how closely the predictions derived from a dataset reflect an actual outcome.

To calculate accuracy, error rate, sensitivity, and specificity, various numerical data must be available: actual positives, actual negatives, correctly predicted positives ("true positives"), correctly predicted negatives ("true negatives"), incorrectly predicted positives ("false positives"), and incorrectly predicted negatives ("false negatives").

Accuracy is a measurement of correct predictions; it is measured as the percentage of correct predictions. Accuracy is calculated by dividing the number of correct predictions by the number of total predictions. This calculation can be assessed by quantifying the number of true positives, true negatives, false positives, and false negatives, adding the true positives and the true negatives for a true calculation number, summing the true positives, true negatives, false positives, and false negatives for a total input number, and dividing the true calculation number by the total input number.

An error rate is a measurement of incorrect predictions. The error rate may also be known as the misclassification rate. The error rate is the opposite of accuracy such that it is the percentage of incorrect predictions. The error rate is calculated by adding together the false positives and the false negatives for a false calculation number and dividing the false calculation number by the total input number. By definition, the error rate plus the accuracy equals the full value, one-hundred percent.

Sensitivity is a measurement of correct positive predictions. Sensitivity may also be known as recall. Sensitivity is calculated by dividing the true positives by the actual positives.

Specificity is a measurement of correct negative predictions. Specificity is calculated by dividing the true negatives by the actual negatives.

Prevalence is a measurement of the frequency of a positive result. Prevalence is calculated by dividing the actual positives by the total input number.

Determining proper AI model outputs may make use of thresholds. A threshold is a value that establishes a boundary for predictions. A threshold may also be called a classification threshold or a decision threshold. In a binary system, a threshold is the dividing line between a 0 or a 1 result. In other words, a calculation must be compared to a threshold to result in a "yes" or a "no" determination. A dichotomous determination, such as choosing between "yes" and "no," is particularly suited for enabling a transition into binary notation. As binary notation is often used in computing, dichotomous determinations are beneficial for use in computing such as in automation of predictions.

A threshold may be selected in such a way that meeting or exceeding the threshold results in either a "yes" or a "no" determination. If a threshold is set such that exceeding it results in a "yes" determination, a value is compared to that threshold, and the exceeds that threshold, that value is predicted as a "yes" result; alternatively, if that value does not exceed the threshold, that value is predicted as a "no" result. Similarly, a threshold is set such that exceeding it results in a "no" determination, a value is compared to that threshold, and the exceeds that threshold, that value is predicted as a "no" result; alternatively, if that value does not exceed the threshold, that value is predicted as a "yes" result.

A threshold may be set as a parameter for various determinations such as yes or no values. A threshold may also be set with respect to a metric. A metric may be a measurement establishing a standard or an acceptable parameter of a specific type. Metrics may include, for example, bias, fairness, drift, and quality. Parameters may be set for input data such as training datasets which may be used in projects which may be selected from catalogs. Surpassing a set threshold may result in approval of a model for deployment.

The present disclosure offers various contributions to the art. Among these contributions are the automated generation of a holdout dataset, automated feature engineering on the holdout dataset to match data transformation done to training data, and automated validation of a model using a transformed holdout dataset.

In a model development cycle, a model may be proposed to predict future occurrences or to provide insight into certain data. The model may then be developed to achieve target results, such as predicting the future occurrences or providing data insight. During development, a model may be trained with training data and tested with testing data. A trained model may then be validated before it is deployed.

A model is typically validated with data the model has not seen before (e.g., holdout data) to determine how well the model will work with new data. For example, a model may be validated with unseen data to assess how well the model will predict the results from a set of external data such as predicting consumer preferences for the next fashion season. If a model meets a set threshold during validation, the model may be approved. A threshold may be, for example, a model correctly predicting 78% of the subsequent purchases of customers based on information provided in a validation dataset.

An approved model may then be deployed for production. Production models may be monitored and validated. A deployed model may, for example, exhibit drift and resultingly fall below a deployment threshold. In such a circumstance, if the model is monitored, the model may be tagged for re-training, re-trained, and re-validated. Re-training and re-validation may require additional datasets which reflect the change in the context such as, for example, the shift in consumer consumption trends.

FIG. 1 illustrates a flowchart of a method/process for validating AI models 100 according to an embodiment of the disclosure. A processor may receive a dataset 110. The processor may then segment the dataset automatically 120 such that the original dataset is split into multiple groups. The original dataset may be duplicated for segmentation such that the original dataset is preserved. The multiple groups segmented from an original dataset may include a model training dataset and a holdout dataset. The model training dataset may be used to generate a model 130. The holdout dataset may be used to validate the model 140.

Figure 2:
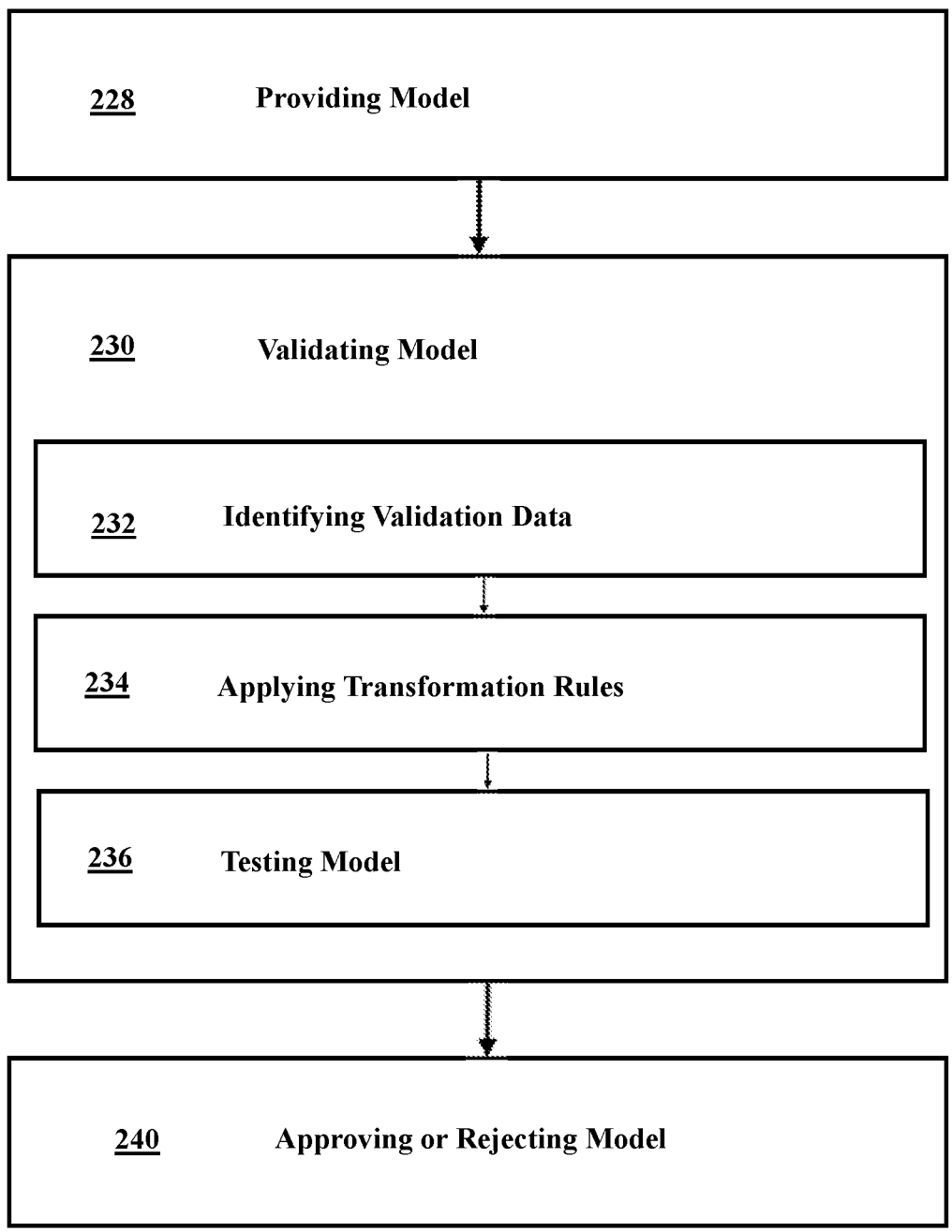
FIG. 2 illustrates a flowchart of a validation segment of a model development cycle according to an embodiment of the disclosure.

FIG. 2 illustrates a flowchart of a validation segment of a model development cycle 200 according to an embodiment of the disclosure. A model may be trained with training data, for example, provided by a data scientist or model engineer. The model may be tested with testing data. The model may then be provided for validation 228, for example, to a computer system utilized by a model validator.

Validation of a model 230 may occur in a number of phases. Validation data for validating the model should be identified 232. Training data may have been transformed according to transformation rules prior to training the model with the training data; if the training data was transformed, the same transformation rules may be applied to the validation data 234 to properly validate the model. Validation data, which may have been transformed, may then be used to test the model 236. The model may then be approved or rejected 240 depending on its performance during validation.

A paradigm in data science is the concept of projects and catalogs. AI models may be built with data from a catalog, also known as catalog data; catalog data to be used to build a model may be used from dedicated subdivisions known as projects. Catalogs are a shared repository containing data that can be used for building different kinds of models. Projects represent a logical unit that encapsulates all artifacts used to build a model. A project may be located within a catalog or may be located elsewhere. For example, a catalog may be located on a hard drive in a central computing center; a project may include data tagged within the catalog, data aggregated into a certain portion of the catalog, data copied from the catalog to a different portion of the same hard drive, data copied from the catalog onto a local hard drive, or any combination thereof. While the disclosure discusses data copied from a catalog into a project, one skilled in the art will recognize that any of the above formations of a project are suitable.

Model development typically involves generating a new project. A data scientist may generate a new project, go to a catalog, find the data for building a model, and copying the data to the project. Data catalogs support the concept of various datasets including training data and holdout data as well as both structured data and unstructured data.

Data used to train AI models may be structured or unstructured. Structured data is organized, formatted, and can be made easily searchable in databases. Unstructured data need not have a pre-defined organization or format, and it is relatively difficult to collect, process, analyze, and search.

Sets of structured data may be connected as linked datasets. Data in linked datasets may be connected relationally. Datasets from multiple data tables or information compilations may be linked. A pair of linked datasets, for example, may include a first dataset with consumer spending habits and a second dataset with the fashion preferences of the same consumers: the relational connection between the datasets is that each dataset contains information about certain consumers. Linked datasets may be helpful, for example, to provide additional context and thereby enhance AI model predictions.

Linked datasets may provide better context when referential integrity is maintained. Maintaining referential integrity requires relations between linked datasets remain intact. For example, in a first linked dataset, the consumer spending of Person A, Person B, and Person C may be tracked; if referential integrity is maintained, then in the second linked dataset, the information regarding the fashion preferences of Person A is linked to the first linked dataset consumer spending information regarding Person A, the fashion preferences of Person B is linked to the spending information regarding Person B, and the fashion preferences of Person C is linked to the spending information regarding Person C. In contrast, if referential integrity is not maintained, in the aforementioned example, the fashion preferences of Person A may be linked to the first dataset, but the preferences of Person A may be aligned with the spending habits of Person B or Person C.

Maintaining referential integrity may require development and application of transformation rules. Transformation rules may result in relational keys linking datasets in a manner to preserve referential integrity. Such transformational rules may, for example, include applying primary key references in a first dataset and requiring other dataset information to reference a valid primary key prior to linking the datasets.

Figure 3:
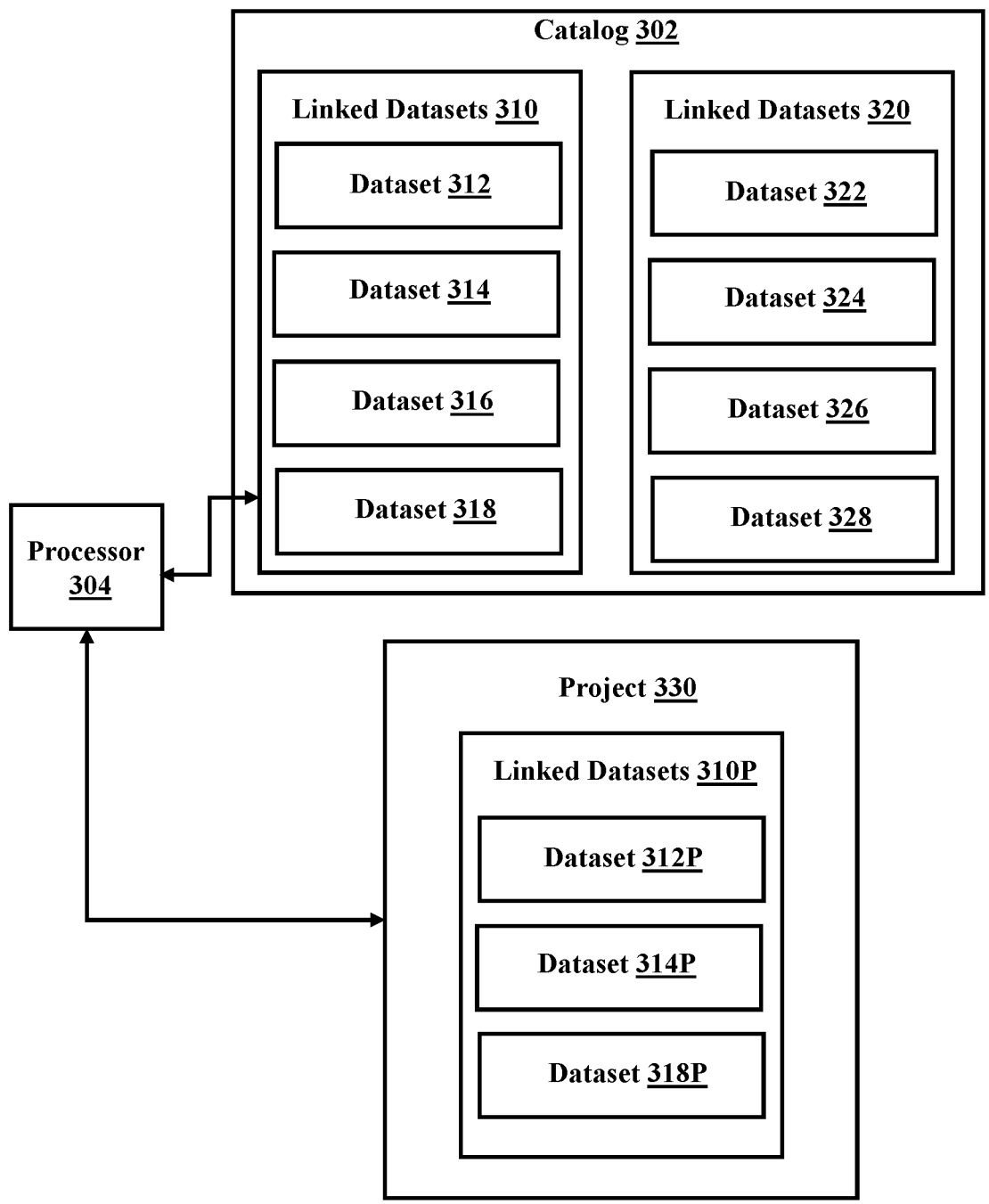
FIG. 3 illustrates a block diagram of a system for retrieval of linked datasets according to an embodiment of the disclosure.

FIG. 3 illustrates a block diagram of retrieval of linked datasets 300 according to an embodiment of the disclosure. A catalog 302 may include numerous datasets 312, 314, 316, 318, 322, 324, 326, and 328. Some of the datasets 312, 314, 316, 318 may be linked datasets 310. Other linked datasets 320 may also be in the catalog 302. Datasets which are not linked to other datasets may also be available in the catalog.

To build a new AI model, a data scientist may find data in the catalog 302 to be used for building the model, generate a new project, and copy the data from the catalog 302 into the project 330. A processor 304 may be helpful for locating and copying desired datasets. Project datasets 312P, 314P, and 318P in the project 330 may be used to train, test, and/or validate the AI model. Data that is used to train a model should not be used to test the model, and data that is used to train or test the model should not be used to validate the model. Data scientists may refer to this as the train/test split: training data, testing data, and validating data should be unique in order to expose the model to new data at each phase to determine whether the model correctly predicts results for previously unseen information.

Project linked datasets 310P may include some or all of a set of linked datasets 310 from a catalog 302. If, for example, a data scientist decided a dataset 316 was irrelevant for the model being built, the data scientist may not copy that dataset 316 into a project 330 but may still copy other datasets 312, 314, and 318 from within the linked dataset 310.

Figure 4:
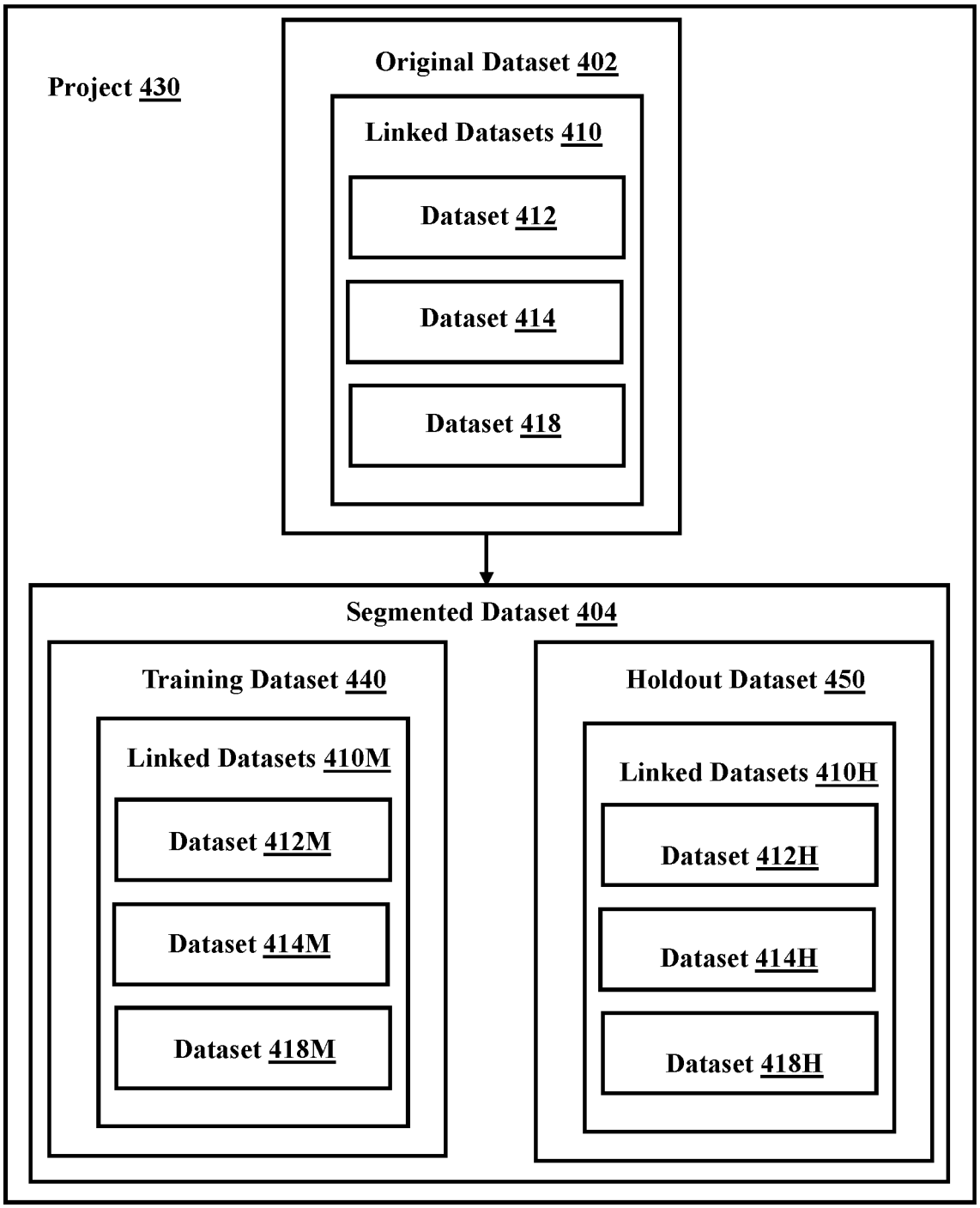
FIG. 4 illustrates a block diagram of segmentation of an original dataset into a training dataset and a holdout dataset according to an embodiment of the disclosure.

FIG. 4 illustrates a block diagram of segmentation of an original dataset into a training dataset and a holdout dataset 400 according to an embodiment of the disclosure. In some embodiments, an original dataset 402 may be imported into a project 430 via a processor. Original dataset 402 may include one or more linked datasets 410 as well as one or more unlinked datasets (not shown). Linked datasets 410 may include dataset 212, dataset 214, and dataset 218.

Original dataset 402 may be separated into a segmented dataset 404. In one embodiment of the present disclosure, original dataset 402 may be separated automatically into segmented dataset 404. In an embodiment of the present disclosure, a data scientist may select original dataset 402 from a catalog, copy original dataset 402 from the catalog into project 430, and original dataset 402 will automatically segment into segmented dataset 404 by the processor, including training dataset 440 and holdout dataset 450. In an embodiment of the disclosure, a computer program product may detect that original dataset 402 has pre-segmented datasets for use for training a model and validation of the model and, as a result of detecting original dataset 402 has pre-segmented datasets for training and validation of a model, may decline to segment original dataset 402.

Holdout dataset generation logic should be intelligent to ensure semantic integrity is maintained. For example, independently generating holdout datasets for dataset 412 and dataset 414 may result in loss of referential integrity. To maintain referential integrity, if the data for customers A, B, and C in dataset 412 are segmented into holdout dataset 450 and thus to dataset 412H, then the data for customers A, B, and C in dataset 414 should also be segmented into holdout dataset 450 and thus to dataset 414H. Similarly, if the data for customers D, E, F, G, and H in dataset 412 are segmented into training dataset 440 and thus to dataset 412M, then the data for the same customers D, E, F, G, and H in dataset 414 should also be segmented into training dataset 440 and thus to dataset 414M.

Segmented dataset 404 may include a training dataset 440 and a holdout dataset 450. Segmented dataset 404 may include the totality of the data from original dataset 402. Training dataset 440 and holdout dataset 450 may each make up a certain percentage of segmented dataset 404. It may be advantageous in some embodiments for training dataset 440 to have more data than holdout dataset 450. In some embodiments, it may be preferable for training dataset 440 to have at least twice as much data as holdout dataset 450.

Training dataset 440 and holdout dataset 450 may have different compositional amounts of segmented dataset 404 for different models or types of models. For example, a certain model predicting fashion trends may use segmented dataset 404 composed 80% of training dataset 440 and 20% of holdout dataset 450. In another example, a different model predicting fraudulent transactions may use segmented dataset 404 composed 70% of training dataset 440 and 30% of holdout dataset 450. In still another example, another model predicting probability of applicants for a loan defaulting on the loan may use segmented dataset 440 composed 75% of training dataset 440 and 25% of holdout dataset 450.

In one embodiment of the present disclosure, a data scientist may select and copy an original dataset 402 to a project 430. The original dataset 402 may include customer transaction data for a total of 500,000 customer transactions. In accordance with the present disclosure, the 500,000 customer transactions may be segmented within project 430 into segmented dataset 404 and split 70% into training dataset 440 and 30% into holdout dataset 450; as such, training dataset 440 would have data for 350,000 customer transactions and data for 150,000 customer transactions would be reserved for validation in holdout dataset 450. Both the training dataset 440 and the holdout dataset 450 may be made a part of the catalog (not shown), and the datasets 440 and 450 may be linked. The catalog (not shown) and project 430 rules will prevent the data scientist from accessing or using holdout dataset 450 while enabling search and use of training dataset 440. A model validator or specific system identification may be required to access holdout dataset 450.

In another embodiment, segmented dataset 404 may include additional dataset groupings which may, for ease, be referred to as segments. For example, segmented dataset 404 may include training dataset 440, a distinct testing dataset (not shown), and holdout dataset 450. In such an embodiment, all segments within segmented dataset 404 may be capable of being combined to build original dataset 402.

Training dataset 440 may include one or more linked datasets 440M such as datasets 412M, 414M, and 418M. Holdout dataset 450 may include one or more linked datasets 410H such as datasets 412H, 414H, and 418H. Dataset 412H within holdout dataset 450 and dataset 412M within training dataset 440 may be segmented from dataset 412 within original dataset 402. Dataset 412H within holdout dataset 450 and dataset 412M within training dataset 440 may be capable of being combined to form dataset 412 as it is (or was) within original dataset 402.

Training dataset 440 may be available to a data scientist or other AI model builder whereas holdout dataset 450 may be unavailable to a data scientist or other AI model builder. Holdout dataset 450 may be unavailable to a data scientist or other AI model builder and available for a model validator. Holdout dataset 450 may be preserved for use by a model validator for model validation.

In some embodiments, a data engineer may ensure constraints are maintained such that a holdout dataset is protected from use by a data scientist building an AI model. In other embodiments, a system incorporating the AI model may be programmed with constraints that automatically protect the holdout dataset from being used by a data scientist building an AI model. The present disclosure enables the automation of the preservation of a holdout dataset using tools and techniques that discover relationships between different data assets. Using these tools may enable the discovery of a relationship between customer profile dataset and transaction datasets. In such a case, a holdout dataset 450 may be generated for the customer profile dataset; a transaction table may then be generated by finding all of the transactions of those customers present in the holdout dataset of the customer profile dataset and segmenting the transactions of those customers into the holdout dataset. Such a process enables maintaining referential integrity.

FIG. 5 illustrates transformation of a training dataset and a holdout dataset 500 according to an embodiment of the disclosure. Segmented dataset 504 may be transformed 506 into transformed segmented dataset 504-T. In some embodiments of the present disclosure, a data scientist may provide repeatable transformation rules to transform training dataset 540 into transformed training dataset 540-T such that linked datasets 510M are transformed into linked datasets 510M-T and datasets 512M, 514M, and 518M are transformed into datasets 512M-T, 514M-T, and 516M-T, respectively; in such an embodiment, the same repeatable transformation rules may be applied to holdout dataset 550 to likewise transform holdout dataset 550 into holdout dataset 550T, transform linked datasets 510H into linked datasets 510H-T, and datasets 512H, 514H, and 518H into datasets 512H-T, 514H-T, and 518H-T. In one embodiment of the disclosure, a computer program product may automatically implement the repeatable transformation rules applied to training dataset 540 to holdout dataset 550.

A data scientist may merge datasets after the datasets are copied to a project 530. A data scientist may use a tool that transforms raw data into more consumable information ready for analysis, or a data scientist may write code to perform a merge. An example of merging may be assigning customer profile data and customer transaction data a customer identification number to facilitate merging the datasets while maintaining referential integrity; the data may be assigned customer identification numbers, joined, and then the customer identification numbers removed as part of the merging process. Another example of merging may be performing one-hot encoding to convert descriptive or categorical columns to numerical columns.

When a data scientist merges datasets, the data scientist should provide how the datasets were transformed in specific, repeatable steps. In other words, the data scientist should provide either the information regarding the tool used to build the project or the function or code used to build the project in a way that may be reproduced by another person or by a machine.

An aspect of the present disclosure is enabling automation of model validation. Model validation is frequently done in a pre-production environment: when a data scientist finishes training a model, the data scientist may notify a model validator, and the model validator may copy the model and its dependent assets into the pre-production environment. In the present disclosure, copying a model and its dependent assets into the pre-production environment may trigger automated model validation.

Figure 6:
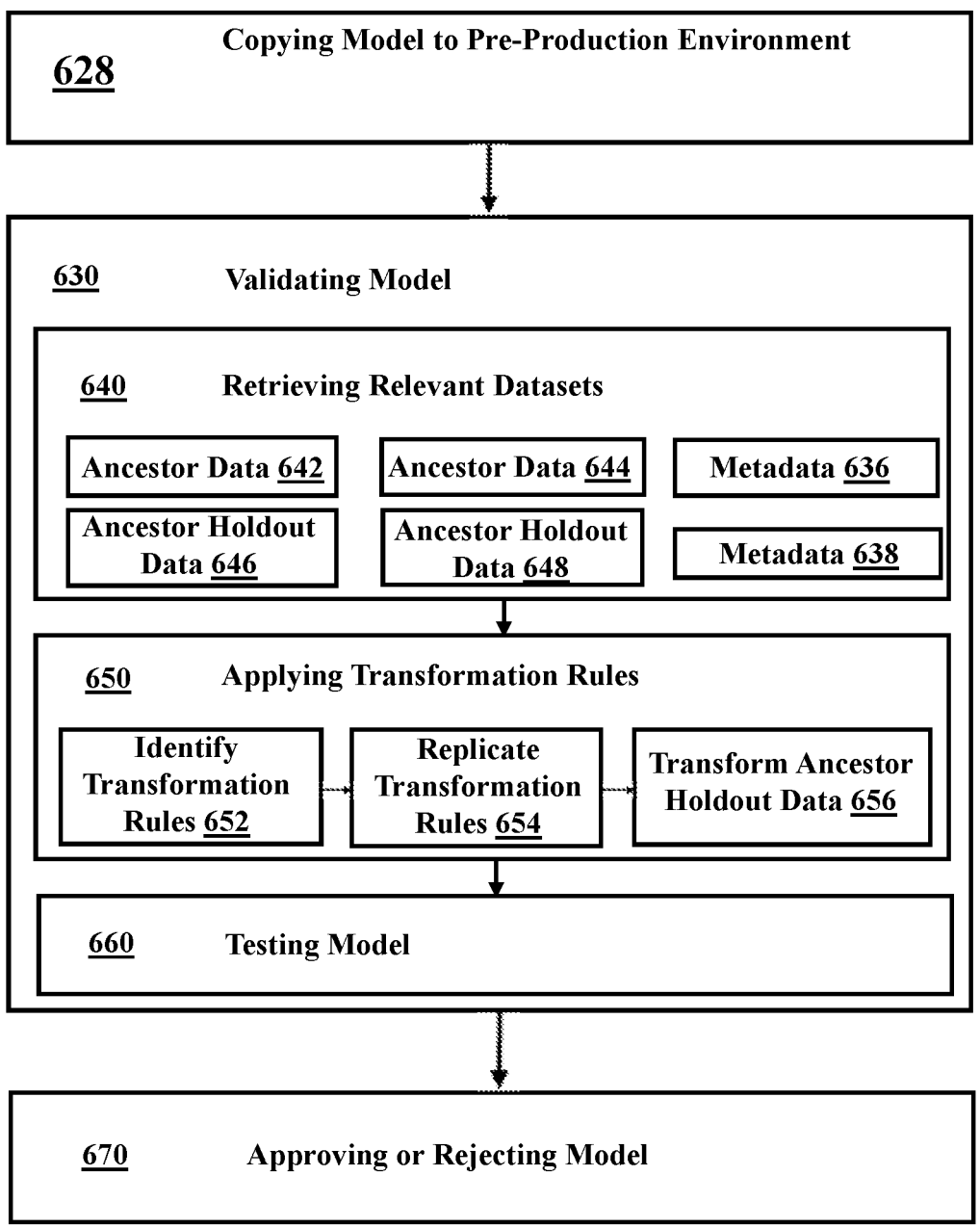
FIG. 6 illustrates a flowchart of an automatic model validation process according to an embodiment of the disclosure.

FIG. 6 illustrates a flowchart of an automatic model validation process 600 according to an embodiment of the disclosure. An AI model is copied to a pre-production environment 628. The copying of the model to the pre-production environment may trigger automatic validation of the copied model 630. Validating the model 630 may include retrieving relevant datasets 640, applying the necessary transformation rules 650, and testing the model 660. According to an embodiment of the disclosure, each of these components may be done automatically.

Retrieving the relevant datasets 640 may include retrieving ancestor data 642 and 644 and identifying the ancestor holdout data 646 and 648. Ancestor data 642, 644, 464, and 648 may be retrieved from a catalog. Metadata 636 and 638 may also be included in the retrieved relevant datasets 640 retrieved from the catalog. Metadata 636 and 638 may include information regarding how the model was built.

Applying transformation rules 650 may include identifying the transformation rules 652, replicating the transformation rules 654, and transforming the ancestor holdout data 656. Metadata 636 and 638 may include information which will help identify transformation rules 652. The transformation rules may then be replicated 654 and used to transform the ancestor holdout data 656 such that the transformed ancestor holdout data 656 has undergone the same transformation as the training data used to build and train the model. The ancestor holdout data 646 and 648 is transformed 656 into a holdout dataset. The holdout dataset may be copied to a dedicated model validation space. The holdout dataset may be made unavailable to the data scientist.

Testing the model 660 may include testing for various metrics. Metrics tested for may include, for example, bias, fairness, drift, and quality. Testing the model 660 may include comparing the results of the model test to thresholds set for one or more metrics; if a model is below a set threshold, it may be rejected and returned, by a processor, to the data scientist who built and trained the model. If a model is rejected, it may be returned to the relevant data scientist with notes, comments, or other indicia of model performance. If approved, notes, comments, or other indicia of performance may be submitted to the data scientist. Test results, notes, comments, and other indicia may also be saved to a repository of model testing data and/or sent to a supervisor and/or model validator.

Automated feedback generated from the automatic validation of an AI model may significantly decrease the time required for model validation. Such automated feedback and validation may, as a result, significantly decrease the time for launching a model to production. Various aspects of the present disclosure may be used, in whole or in part, to substantially decrease the workload of a model validator and expedite model launch without sacrificing on standards.

Validating an AI model may be done on a local computer, on a remote computer, on the cloud, or may use any suitable combination thereof.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but the consumer has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software which may include operating systems and applications. The consumer does not manage or control the underlying cloud infrastructure but has control over operating systems, storage, deployed applications, and possibly limited control of select networking components (e.g., host firewalls).

Deployment models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and/or compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
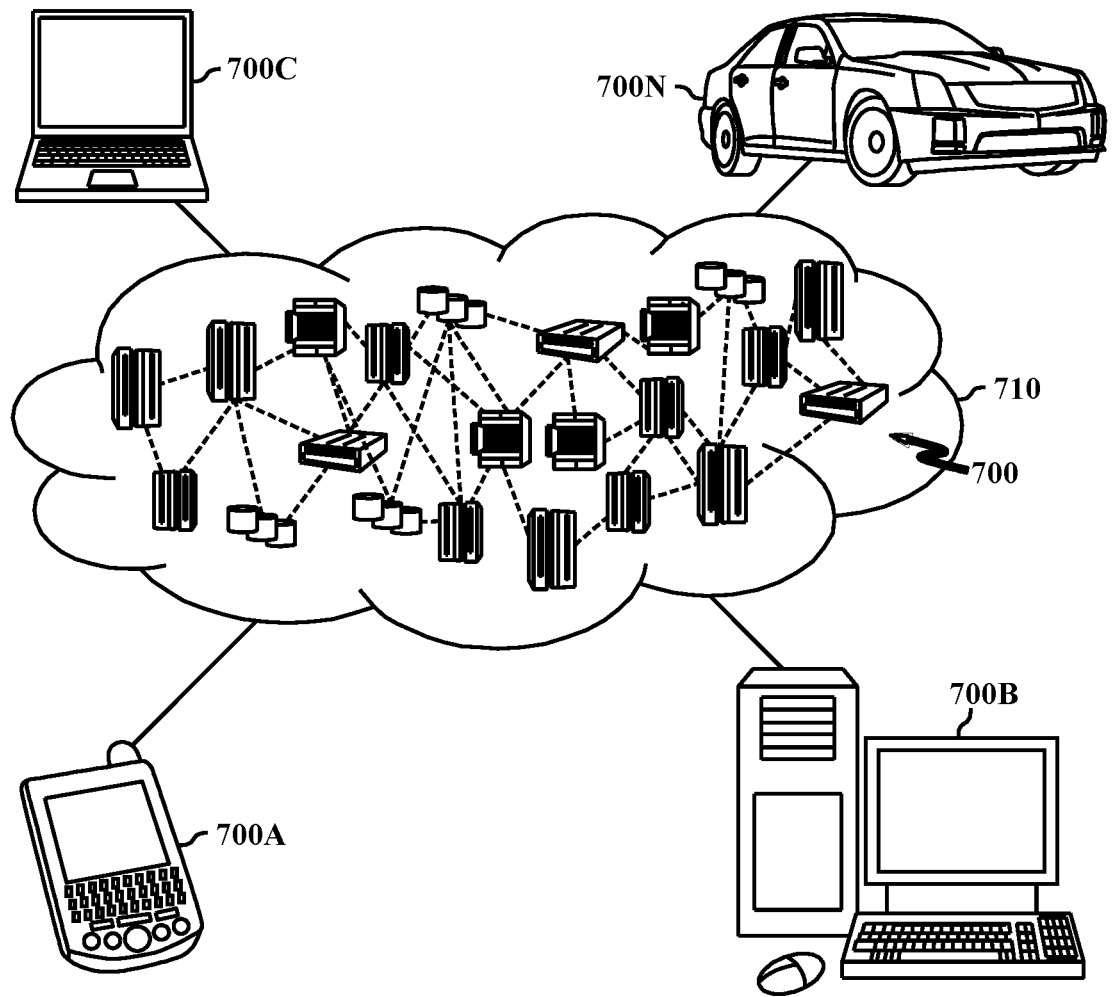
FIG. 7 illustrates a cloud computing environment, in accordance with embodiments of the present disclosure.

FIG. 7 illustrates a cloud computing environment 710 in accordance with embodiments of the present disclosure. As shown, cloud computing environment 710 includes one or more cloud computing nodes 700 with which local computing devices used by cloud consumers, such as, for example, personal digital assistant (PDA) or cellular telephone 700A, desktop computer 700B, laptop computer 700C, and/or automobile computer system 700N may communicate. Nodes 700 may communicate with one another. They may be grouped (not shown) physically or virtually, in one or more networks, such as Private, Community, Public, or Hybrid clouds as described hereinabove, or a combination thereof.

This allows cloud computing environment 710 to offer infrastructure, platforms, and/or software as services for which a cloud consumer does not need to maintain resources on a local computing device. It is understood that the types of computing devices 700A-N shown in FIG. 7 are intended to be illustrative only and that computing nodes 700 and cloud computing environment 710 can communicate with any type of computerized device over any type of network and/or network addressable connection (e.g., using a web browser).

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Figure 8:
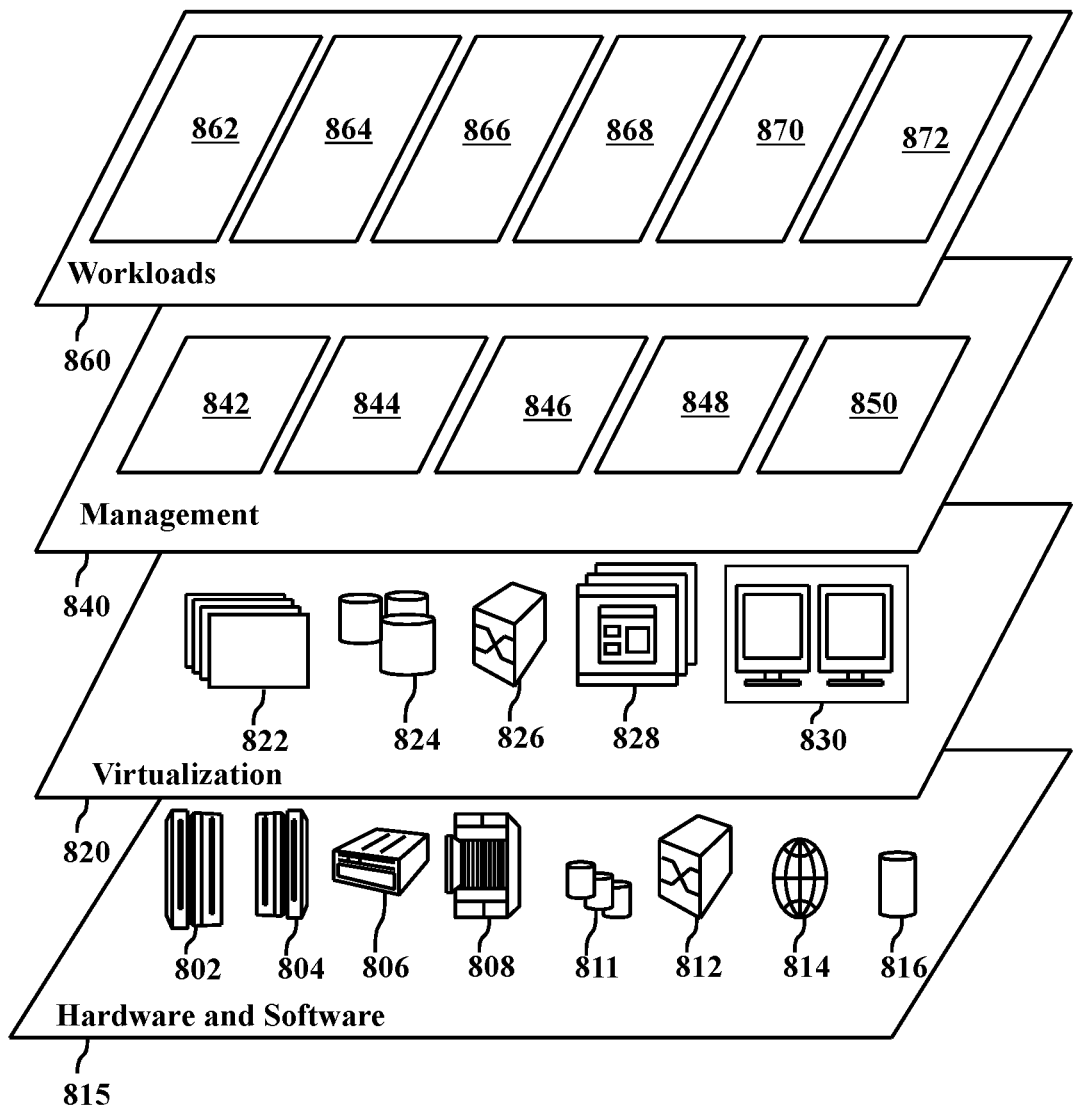
FIG. 8 illustrates abstraction model layers, in accordance with embodiments of the present disclosure.

FIG. 8 illustrates abstraction model layers 800 provided by cloud computing environment 710 (FIG. 7) in accordance with embodiments of the present disclosure. It should be understood in advance that the components, layers, and functions shown in FIG. 8 are intended to be illustrative only and embodiments of the disclosure are not limited thereto. As depicted below, the following layers and corresponding functions are provided.

Hardware and software layer 815 includes hardware and software components. Examples of hardware components include: mainframes 802; RISC (Reduced Instruction Set Computer) architecture-based servers 804; servers 806; blade servers 808; storage devices 811; and networks and networking components 812. In some embodiments, software components include network application server software 814 and database software 816.

Virtualization layer 820 provides an abstraction layer from which the following examples of virtual entities may be provided: virtual servers 822; virtual storage 824; virtual networks 826, including virtual private networks; virtual applications and operating systems 828; and virtual clients 830.

In one example, management layer 840 may provide the functions described below. Resource provisioning 842 provides dynamic procurement of computing resources and other resources that are utilized to perform tasks within the cloud computing environment. Metering and pricing 844 provide cost tracking as resources and are utilized within the cloud computing environment as well as billing or invoicing for consumption of these resources. In one example, these resources may include application software licenses. Security provides identity verification for cloud consumers and tasks as well as protection for data and other resources. User portal 846 provides access to the cloud computing environment for consumers and system administrators. Service level management 848 provides cloud computing resource allocation and management such that required service levels are met. Service level agreement (SLA) planning and fulfillment 850 provide pre-arrangement for, and procurement of, cloud computing resources for which a future requirement is anticipated in accordance with an SLA.

Workloads layer 860 provides examples of functionality for which the cloud computing environment may be utilized. Examples of workloads and functions which may be provided from this layer include: mapping and navigation 862; software development and lifecycle management 864; virtual classroom education delivery 866; data analytics processing 868; transaction processing 870; and automatic AI model training 872.

Figure 9:
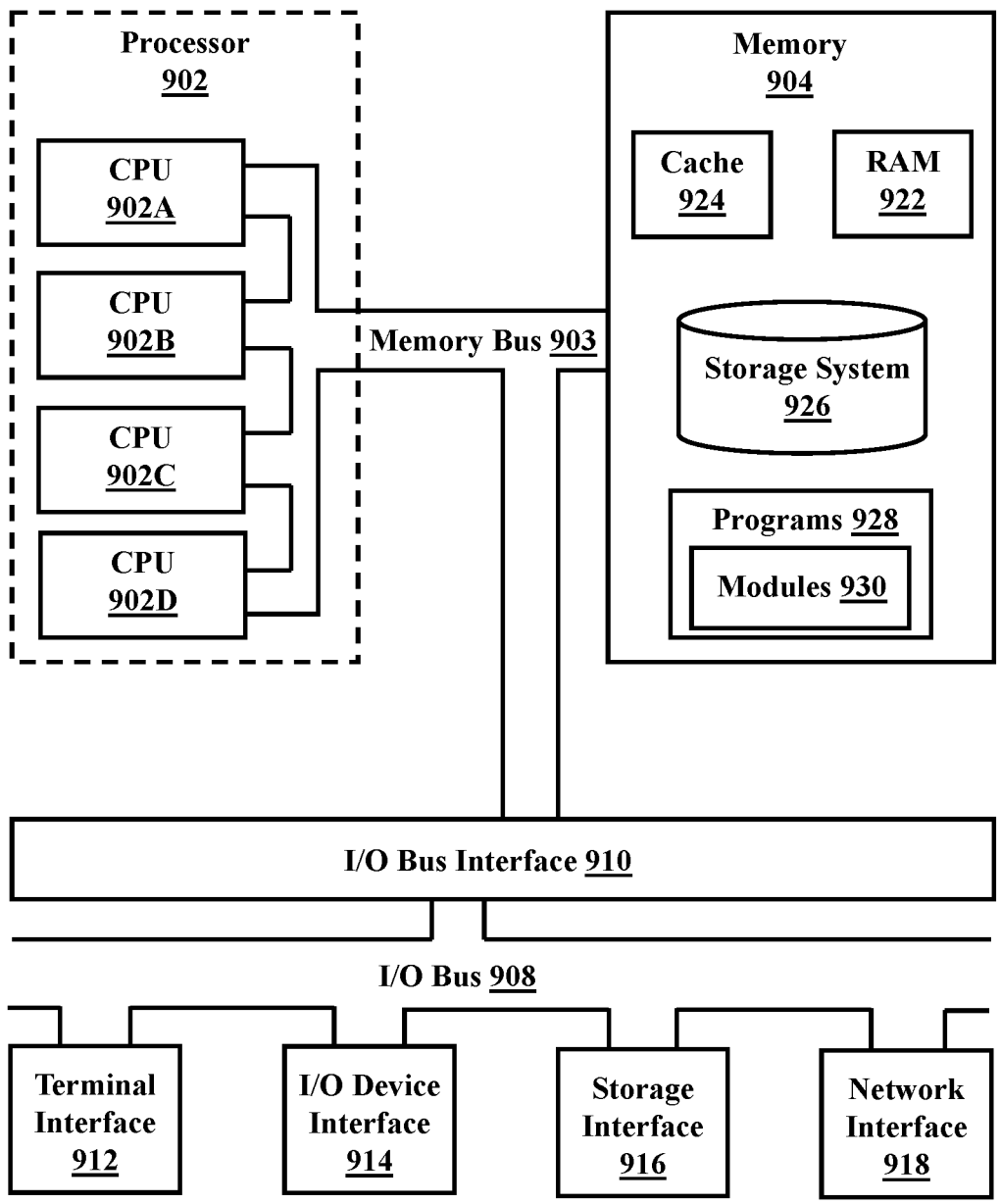
FIG. 9 illustrates a high-level block diagram of an example computer system that may be used in implementing one or more of the methods, tools, and modules, and any related functions, described herein, in accordance with embodiments of the present disclosure.

FIG. 9 illustrates a high-level block diagram of an example computer system 901 that may be used in implementing one or more of the methods, tools, and modules, and any related functions, described herein (e.g., using one or more processor circuits or computer processors of the computer) in accordance with embodiments of the present disclosure. In some embodiments, the major components of the computer system 901 may comprise a processor 902 with one or more central processing units (CPUs) 902A, 902B, 902C, and 902D, a memory subsystem 904, a terminal interface 912, a storage interface 916, an I/O (Input/Output) device interface 914, and a network interface 918, all of which may be communicatively coupled, directly or indirectly, for inter-component communication via a memory bus 903, an I/O bus 908, and an I/O bus interface unit 910.

The computer system 901 may contain one or more general-purpose programmable CPUs 902A, 902B, 902C, and 902D, herein generically referred to as the CPU 902. In some embodiments, the computer system 901 may contain multiple processors typical of a relatively large system; however, in other embodiments, the computer system 901 may alternatively be a single CPU system. Each CPU 902 may execute instructions stored in the memory subsystem 904 and may include one or more levels of on-board cache.

System memory 904 may include computer system readable media in the form of volatile memory, such as random access memory (RAM) 922 or cache memory 924. Computer system 901 may further include other removable/non-removable, volatile/non-volatile computer system storage media. By way of example only, storage system 926 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM, or other optical media can be provided. In addition, memory 904 can include flash memory, e.g., a flash memory stick drive or a flash drive. Memory devices can be connected to memory bus 903 by one or more data media interfaces. The memory 904 may include at least one program product having a set (e.g., at least one) of program modules that are configured to carry out the functions of various embodiments.

One or more programs/utilities 928, each having at least one set of program modules 830 may be stored in memory 904. The programs/utilities 928 may include a hypervisor (also referred to as a virtual machine monitor), one or more operating systems, one or more application programs, other program modules, and program data. Each of the operating systems, one or more application programs, other program modules, and program data, or some combination thereof, may include an implementation of a networking environment. Programs 928 and/or program modules 930 generally perform the functions or methodologies of various embodiments.

Although the memory bus 903 is shown in FIG. 9 as a single bus structure providing a direct communication path among the CPUs 902, the memory subsystem 904, and the I/O bus interface 910, the memory bus 903 may, in some embodiments, include multiple different buses or communication paths, which may be arranged in any of various forms, such as point-to-point links in hierarchical, star, or web configurations, multiple hierarchical buses, parallel and redundant paths, or any other appropriate type of configuration. Furthermore, while the I/O bus interface 910 and the I/O bus 908 are shown as single respective units, the computer system 901 may, in some embodiments, contain multiple I/O bus interface units 910, multiple I/O buses 908, or both. Further, while multiple I/O interface units 910 are shown, which separate the I/O bus 908 from various communications paths running to the various I/O devices, in other embodiments some or all of the I/O devices may be connected directly to one or more system I/O buses 908.

In some embodiments, the computer system 901 may be a multi-user mainframe computer system, a single-user system, or a server computer or similar device that has little or no direct user interface but receives requests from other computer systems (clients). Further, in some embodiments, the computer system 901 may be implemented as a desktop computer, portable computer, laptop or notebook computer, tablet computer, pocket computer, telephone, smartphone, network switches or routers, or any other appropriate type of electronic device.

It is noted that FIG. 9 is intended to depict the representative major components of an exemplary computer system 901. In some embodiments, however, individual components may have greater or lesser complexity than as represented in FIG. 9, components other than or in addition to those shown in FIG. 9 may be present, and the number, type, and configuration of such components may vary.

Additional aspects of the present disclosure will be apparent to those skilled in the art. Some of these aspects are described further below.

The present disclosure includes a method for automating model validation. The method for automating AI model validation may include receiving an original dataset via a processor and automatically segmenting the original dataset into multiple data groups. The multiple data groups may include a model training dataset and a holdout dataset. The method may further include generating a model with the model training dataset automatically segmented from the original dataset and validating said model with the holdout dataset which was automatically segmented from the original dataset.

The present disclosure further explains a method for automating model validation for a dataset that includes a linked dataset such that the holdout dataset maintains referential integrity across linked datasets.

The present disclosure further discusses a method for automating model validation that includes a processor retrieving a model training dataset from the original dataset whereas the holdout dataset is unavailable. The model training dataset may be made available for building and training models. The holdout dataset may be unavailable for the processor to retrieve or the holdout dataset may be otherwise prevented from model training use. The method may further include a user defining one or more repeatable actions for a processor to perform on the model training dataset. These repeatable actions may be a transformation. Performing these repeatable actions on the model training data may result in generating the model. The method may further include the automatic performance of the one or more repeatable actions on the holdout dataset.

The present disclosure further discusses a method for automating part or all of AI model validation including selecting the original dataset from a catalog and aggregating the original dataset into a project. A catalog is a data repository; data stored in a catalog may be used for many different models including many different types of models. A project may house all of the information to build, train, and validate a model. Catalogs may encapsulate one or more projects, and projects may be external to any catalog.

The present disclosure further explains a method for automating AI model validation that includes receiving input from a user such as the user selecting an original dataset to use for building, training, and validating a model.

The present disclosure further describes a method for automating some or all of AI model validation that includes comparing the results from the validation of a model to a model validation threshold. The threshold may be established using pre-selected metrics. If the model fails to meet the model validation threshold, the model may be rejected. The model may be rejected automatically upon failure to meet the threshold; alternatively, a rejection notification may be sent to a validating user. If the model meets or exceeds the model validation threshold, the model may be approved. The model may be approved automatically upon meeting or exceeding the threshold; alternatively, an approval notification may be sent to a validating user.

The present disclosure further discusses a method for automating model validation including establishing pre-selected metrics to compare an AI model against. The pre-selected metrics may include bias, fairness, drift, and quality. Other applicable metrics may also be used.

The present disclosure further explains a method for automating AI model validation that includes automatically segmenting an original dataset into multiple data groups. The automatic segmentation may be done both randomly and in a uniform fashion. This random-yet-uniform segmentation may be a stratified random selection process. A stratified random selection process may also be referred to as stratified random sampling or, more simply, as stratified sampling.

The present disclosure also describes a system that automatically validates AI models. The system may include a processor. The processor may receive an original dataset and automatically extract a holdout dataset therefrom. The processor may receive a model built with a training dataset that came from the original dataset. The processor may validate the model with the holdout dataset automatically extracted from the original dataset.

The present disclosure further discusses a system that automatically validates models for original datasets that include at least one linked dataset and the holdout dataset maintains referential integrity across linked datasets. This may include original datasets with only one linked dataset and original datasets with multiple linked datasets.

The present disclosure further explains a system for automatically validating models that also includes specifying one or more repeatable actions to be performed on the model training dataset. The processor may retrieve the model training dataset from the original dataset. The holdout dataset may be unavailable for use in the model training dataset. The model may be generated by performing the one or more repeatable actions on the model training set. The one or more repeatable actions performed on the model training set may similarly be performed on the holdout dataset as part of the validation of the model.

The present disclosure further describes a system for automating AI model validation that includes the original dataset being selected from a catalog. The original dataset selected from the catalog may be aggregated into a project.

The present disclosure further discusses a system for automatically validating AI models that includes a user selecting the original dataset from the catalog.

The present disclosure further explains a system for automating part or all of the AI model validation process that includes a model validation threshold. The model validation threshold may be established using pre-selected metrics. The processor may use the holdout dataset to assess the model against the threshold to grant validation results. The processor may automatically reject the model upon failing to meet the validation threshold. Alternatively, the processor may automatically approve the model upon meeting or exceeding the threshold. Regardless of whether the model is rejected or approved, feedback may be made available to the data scientist who developed the model, to the supervisor of that data scientist, to a model validating user, and/or to a repository for model assessment data.

The present disclosure further describes a system for AI model validation that includes the processor automatically segmenting the original dataset randomly and in a uniform fashion into multiple data groups. Such random and uniform segmentation may be referred to as a stratified random selection process, stratified random sampling, or, simply, stratified sampling.

The present disclosure also discusses a computer program product for automating AI model validation in whole or in part. The computer program product may include a computer readable storage medium with program instructions which are executable by a processor to cause a processor to perform a certain function. The function the processor is caused to perform may include receiving an original dataset, automatically segmenting the original dataset into multiple groups including a model training dataset and a holdout dataset, generating a model with the model training dataset, and validating the model with the holdout dataset.

The present disclosure further explains that the computer program product may receive an original dataset with at least one linked dataset and that the holdout dataset maintains the referential integrity across the linked datasets.

The present disclosure further describes that the computer program product may include the processor receiving the model training dataset from the segmented original dataset. The holdout dataset may be unobtainable by the processor or otherwise unavailable for use for training the model. A user may define one or more repeatable actions to be performed on the model training dataset by the processor. A model may be generated by performing the one or more repeatable actions on the model training dataset. The one or more repeatable actions may automatically be performed on the holdout dataset.

The present disclosure further discusses that the computer program product that automates part or all of an AI model validation may include comparing validation results of a model to a model validation threshold. The model validation threshold may be established based on pre-selected metrics. The pre-selected metrics establishing the model validation threshold may include bias, fairness, drift, and quality. If the model fails to meet the model validation threshold, the model may be rejected; if the model meets or exceeds the model validation threshold, the model may be approved. Either rejection or approval of the model may be done automatically as part of the computer program product.

The present disclosure further details the use of the computer program product automatically segmenting the original dataset into multiple data groups randomly and in a uniform fashion. Such random and uniform segmentation may be referred to as a stratified random selection process, as stratified random sampling, or simply as stratified sampling.

As discussed in more detail above, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide, or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN) or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or the technical improvement over technologies found in the marketplace or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method for automating model validation, said method comprising:
   receiving an original dataset via a processor, wherein said original dataset has at least one linked dataset;
   segmenting, automatically, said original dataset into a plurality of data groups, wherein said plurality of data groups include a model training dataset and a holdout dataset, and wherein said holdout dataset maintains referential integrity across linked datasets;
   generating a model with said model training dataset by performing one or more repeatable actions on said model training dataset;
   triggering automatic model validation of said model by copying said model into a pre-production environment; and
   validating said model with said holdout dataset.

2. The method of claim 1 further comprising:
   retrieving, by said processor, said model training dataset from said original dataset, wherein said holdout dataset is unavailable for use in said model training dataset;
   defining, by a user, said one or more repeatable actions to be performed on said model training dataset via said processor after segmenting said original dataset; and
   performing, automatically, said one or more repeatable actions on said holdout dataset.

3. The method of claim 1 further comprising:
   selecting said original dataset from a catalog; and
   aggregating said original dataset in a project.

4. The method of claim 3 wherein said selecting said original dataset includes receiving user input by a user, wherein said user input includes said user selecting said original dataset.

5. The method of claim 1 further comprising:
   comparing validation results of said model to pre-selected metrics, wherein said pre-selected metrics establish a model validation threshold; and
   rejecting said model if said model fails to meet said model validation threshold.

6. The method of claim 5 wherein said pre-selected metrics are selected from a list consisting of fairness, bias, quality, and drift.

7. The method of claim 1 wherein segmenting, automatically, said original dataset into a plurality of data groups includes randomly, in a uniform fashion, segmenting said original dataset.

8. A system that automatically validates models, said system comprising:
   a memory; and
   a processor in communication with said memory, said processor being configured to perform operations comprising:
      receiving an original dataset, wherein said original dataset has at least one linked dataset;
      segmenting, automatically, said original dataset into a plurality of data groups, wherein said plurality of data groups include a model training dataset and a holdout dataset, wherein said holdout dataset maintains referential integrity across linked datasets;
      generating a model with said model training dataset by performing one or more repeatable actions on said model training dataset;
      triggering automatic model validation of said model by copying said model into a pre-production environment; and
      validating said model with said holdout dataset.

9. The system of claim 8 wherein the operations further comprise:
   retrieving, by said processor, said model training dataset from said original dataset, wherein said holdout dataset is unavailable for use in said model training dataset;
   defining, by a user, said one or more repeatable actions to be performed on said model training dataset via said processor after segmenting said original dataset; and
   performing, automatically, said one or more repeatable actions on said holdout dataset.

10. The system of claim 8 wherein the operations further comprise:
   selecting said original dataset from a catalog; and
   aggregating said original dataset in a project.

11. The system of claim 10 wherein said selecting said original dataset includes receiving user input by a user, wherein said user input includes said user selecting said original dataset.

12. The system of claim 8 wherein the operations further comprise:
   comparing validation results of said model to pre-selected metrics, wherein said pre-selected metrics establish a model validation threshold; and
   rejecting said model if said model fails to meet said model validation threshold.

13. The system of claim 8 wherein segmenting, automatically, said original dataset into a plurality of data groups includes randomly, in a uniform fashion, segmenting said original dataset.

14. A computer program product for automatic model validation, said computer program product comprising a computer readable storage medium having program instructions embodied therewith, said program instructions executable by a processor to cause said processor perform a function, said function comprising:
   receiving an original dataset, wherein said original dataset has at least one linked dataset;
   segmenting, automatically, said original dataset into a plurality of data groups, wherein said plurality of data groups include a model training dataset and a holdout dataset, and wherein said holdout dataset maintains referential integrity across linked datasets;
   generating a model with said model training dataset by performing one or more repeatable actions on said model training dataset;
   triggering automatic model validation of said model by copying said model into a pre-production environment; and
   validating said model with said holdout dataset.

15. The computer program product of claim 14 wherein said function further comprises:
   retrieving, by said processor, said model training dataset from said original dataset, wherein said holdout dataset is unavailable for use in said model training dataset;
   defining, by a user, said one or more repeatable actions to be performed on said model training dataset via said processor after segmenting said original dataset; and
   performing, automatically, said one or more repeatable actions on said holdout dataset.

16. The computer program product of claim 14 wherein said function further comprises:
   comparing validation results of said model to pre-selected metrics, wherein said pre-selected metrics establish a model validation threshold, and wherein said pre-selected metrics are selected from a list consisting of fairness, bias, quality, and drift; and
   rejecting said model if said model fails to meet said model validation threshold.

17. The computer program product of claim 14 wherein segmenting, automatically, said original dataset into a plurality of data groups includes randomly, in a uniform fashion, segmenting said original dataset.

\* \* \* \* \*